United States Patent [19]
Walters et al.

[11] Patent Number: 5,090,665
[45] Date of Patent: Feb. 25, 1992

[54] DEPLOYING CABLES

[75] Inventors: David L. Walters, Stortford; Martin Healy, Harlow; Ernest C. Marlow, Sawbridgeworth; David F. Harrison, Old Harlow, all of United Kingdom

[73] Assignee: STC PLC, London, England

[21] Appl. No.: 594,389

[22] Filed: Oct. 5, 1990

[30] Foreign Application Priority Data

Oct. 7, 1989 [GB] United Kingdom ............... 8922643

[51] Int. Cl.$^5$ ............................................. B65H 59/00
[52] U.S. Cl. ............................................. 254/134.4
[58] Field of Search ............ 242/45; 254/134.3 FT, 254/134.3 R, 134.3 SL

[56] References Cited

U.S. PATENT DOCUMENTS

| | | | |
|---|---|---|---|
| 3,931,938 | 1/1976 | Husegawa et al. | 242/45 |
| 4,500,043 | 2/1985 | Brown | 242/45 |
| 4,669,705 | 6/1987 | Langston | 254/134.3 FT |
| 4,728,079 | 3/1988 | Nitta et al. | 254/134.3 FT |

FOREIGN PATENT DOCUMENTS

| | | |
|---|---|---|
| 0253636 | 1/1988 | European Pat. Off. . |
| 1497569 | 1/1978 | United Kingdom . |
| 2029982 | 3/1980 | United Kingdom . |
| 2166602 | 5/1986 | United Kingdom . |
| 88/07183 | 9/1988 | World Int. Prop. O. . |

Primary Examiner—Robert C. Watson
Attorney, Agent, or Firm—Lee, Mann, Smith, McWilliams & Sweeney

[57] ABSTRACT

A method of installing a cable, particularly but not exclusively in a duct filled with flowing liquid, wherein, as the cable is deployed, the strain in the cable is determined by sending a signal down the cable and receiving a signal back from the cable. The speed of deployment is adjusted according to the strain detected. Preferably the system is applied to optical cables, and a radio frequency signal is modulated on an optical carrier. optical connection to the cable on the rotating drum is made via an optical slip-ring. The front end of the cable has a silvered end termination for reflecting the modulated signal back along the fibre to be detected by an optical receiver, and there is a vector voltmeter for determining the phased difference between the signals to thus determine the strain in the cable.

6 Claims, 2 Drawing Sheets

DEPLOYING CABLES

This invention relates to deploying cables, particularly although not exclusively, to laying cables in ducts using a fluid to transport or help transport the cable through the duct.

Our granted British patent 2171218B discloses a method of deploying a communications cable in a pipeline by inserting one end of the cable into the pipeline and causing liquid flowing through the pipeline to pull the cable in the direction of liquid flow. Usually a drogue is attached to the front of the cable, and this acts not only as a drag-inducing device against the flow of liquid to pull the cable, but also to guide the front end of the cable along the duct.

In some instances it is necessary to use this technique to lay a pull-line and then attached the pull-line to the cable and pull the cable through the duct using the pull line together with the assistance given by liquid flowing through the duct and the buoyancy of the liquid. In this instance the pull line acts in place of the drogue, and is useful in situations where a high pulling force is required.

Where a cable is deployed by such a technique over long distances, then larger forces can be exerted on the cable, and careful control is necessary so that the speed of deployment of the cable being laid can be adjusted in accordance with the flow conditions and route i.e. whether it is a smooth unobstructed route or a more tortuous route with obstructions on the way. If careful control is not employed or if flow is interrupted, then damage can result to the cable being deployed. Deployment may include recovery of the cable. It is an object of the present invention to enable greater control over the cable deployment to be achieved.

According to the present invention there is provided a method of deploying an optical fibre cable by pulling the cable from a store of the cable comprising monitoring the strain in the cable by monitoring an optical signal in a fibre of the cable and controlling the deployment according to the strain monitored.

According to another aspect of the invention there is provided apparatus for measuring cable strain during deployment, comprising means for feeding an optical signal into the cable via a rotary optical joint, means for detecting a received signal from the cable via a reflective end termination at the end of the cable, means for determining the strain in the cable being deployed, and means for changing the deployment speed in response to the detected strain.

Conveniently a light source such as a laser is modulated with an rf signal, and the phase change of the modulated signal is measured after traversing the measured fibre within the cable. Changes in this phase change can then be related directly to optical length changes, and absolute optical length can be measured from the gradient of the phase/frequency characteristic. This enables the "global" fibre strain to be determined.

In order that the invention can be clearly understood reference will now be made to the accompanying drawings in which.

Figure 1:
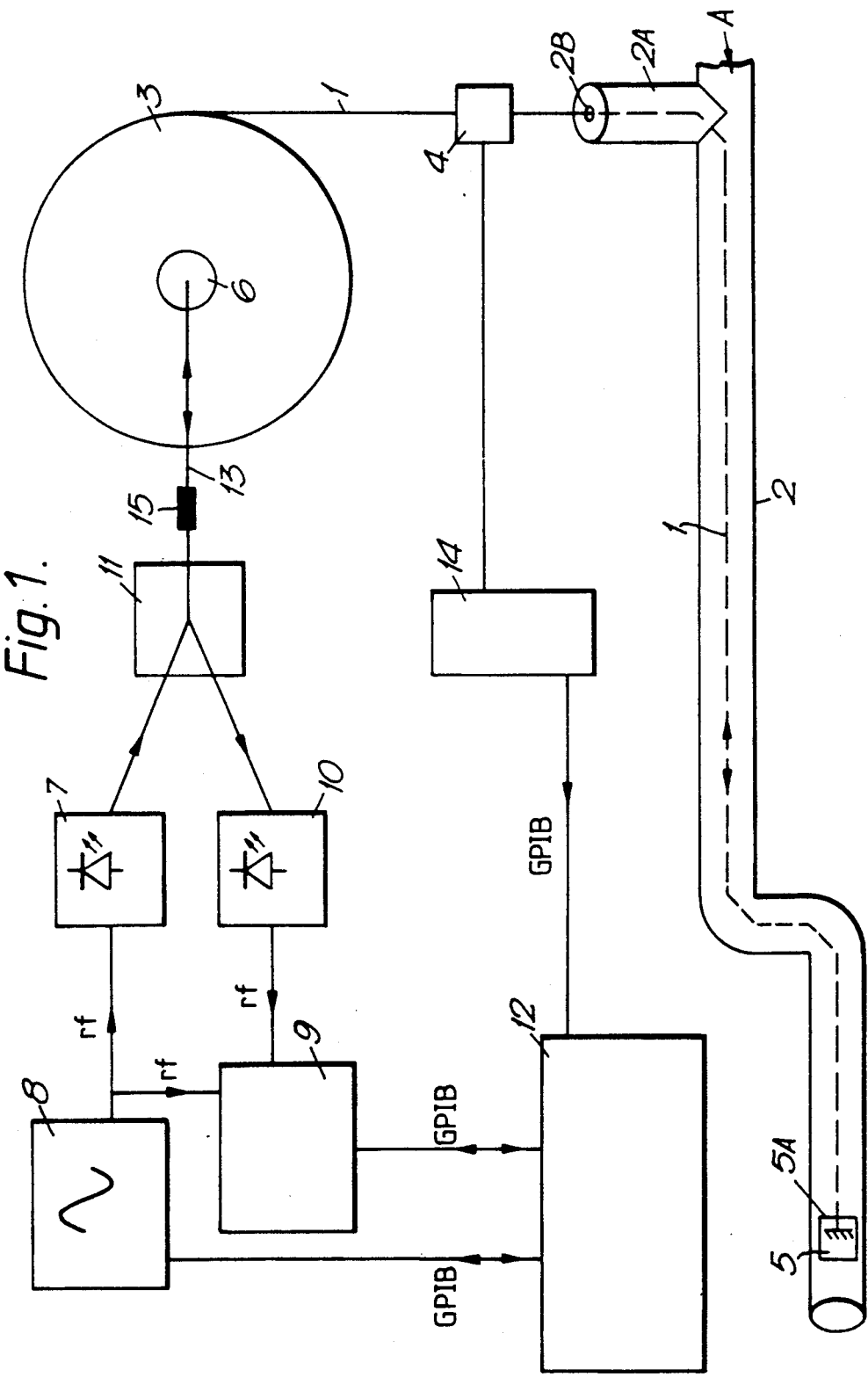
FIG. 1 is a block schematic diagram of an optical cable laying system according to an embodiment of the present invention.

Referring to FIG. 1 of the drawings, it is proposed to lay a cable 1 in a duct 2 through which a liquid such as water is flowing in the direction of arrow A from right to left as viewed in the Figure. The technique employed in deploying the cable is similar to that disclosed in our patent 217128B mentioned above.

As the cable is deployed from a drum 3 via a side entrance tube 2A and suitable seal 2B to prevent water leakage out of tube 2A, the length of cable entering the duct is measured by a mechanical length counter 4.

At the remote end of the cable 1 there is a silvered and terminated end arrangement 5 so that a signal passed down a fibre of the cable 1 will be reflected back along the cable.

A drogue or pull line is normally attached to the front of the cable, and this assists the liquid in installing the cable.

This optical transmission is made possible by an optical rotary joint 6 attached to the cable drum 3.

Figure 2:
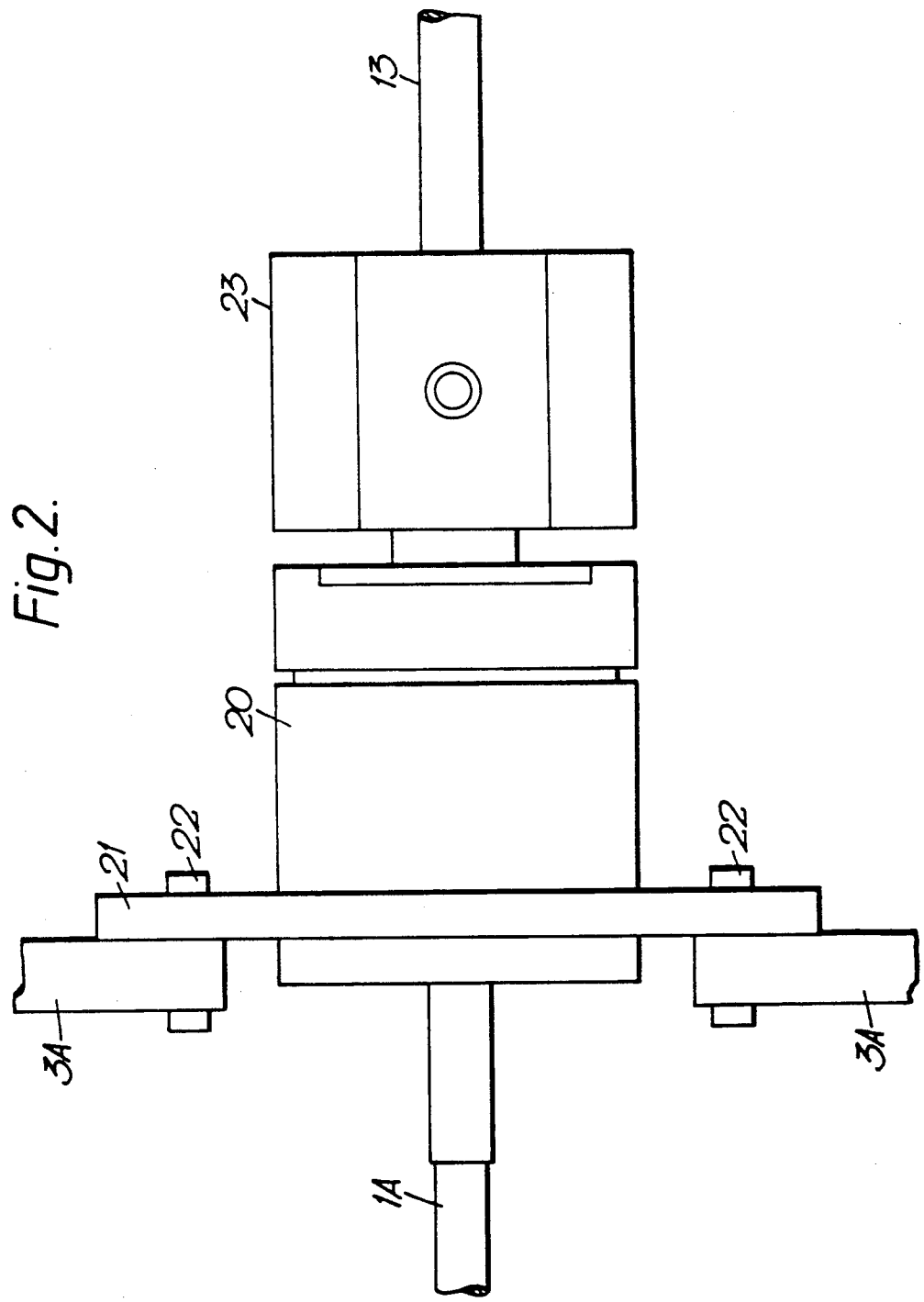
FIG. 2 shows a detail of the arrangement of FIG. 1.

One form of joint is shown in FIG. 2. The joint 6 (FIG. 2) comprises a stator 20 which has a flange 21 secured by screws 22 to one cheek 3A of the drum 3. The inner end 1A of the cable 1 on the drum 3 is optically connected to the stator 20 and a rotor 23 of the joint is optically connected to the connecting cable 13.

FIG. 1 also shows a block diagram of the measurement arrangement. A low power 1300 nm laser with a single mode fibre tail 7 is modulated with a radio frequency signal wave from a frequency synthesiser 8, and a vector volt meter 9 measures the phase difference between the signal applied to the laser 7 and the signal received at the output of a PINFET detector 10 which detects the returned optical signal along the cable 1 by means of the silvered and terminated end arrangement 5. A single mode optical Y coupler 11 couples the output signal from the laser 7 to the fibre of the cable 1 via connecting cable 13 and the rotary joint 6, and also couples the output signal from the cable 1 which has been returned by the silvered and terminated arrangement 5, to the receiver 10.

Changes in the phase change can be related directly to optical length changes caused by stress in the laying procedure, or absolute optical length can be measured from the gradient of the phase/frequency characteristic. This enables the global fibre strain to be determined. As shown in the drawing, the equipment is controlled by a small computer 12 with appropriate software to process the results and display the relevant information digitally or graphically as required.

The silvered and terminated end arrangement is protected from the liquid in which the cable is immersed by a termination arrangement 5A. The optical Y-coupler 11 is coupled via an optical cable 13 to the optical rotary joint 6, and there is a plug and socket arrangement 15 so that the test equipment can be plugged into and unplugged from the cable drum.

The mechanical length counter 4 provides a pulse per unit length which is fed to a pulse counter 14 which feeds the controlling computer 12.

Measurement Method

For an rf signal with modulation frequency f, the phase change $\phi$ across a length of fibre with effective refractive index N, is:

$$\phi = 360 \, pNf/C$$

$$(C = 3 \times 10^8 \, ms^{-1})$$

The length can therefore be found from the gradient of the phase/frequency characteristic, assuming the refractive index. Since the refractive index itself varies with temperature and strain, it is useful to define the concept of optical length i.e. N—an assumed refractive index (1.453). In order to obtain this optical length with 10 ppm resolution a phase change of at least $5 \times 10^4$ degrees must be observed. As with any phase-measuring instrument, the vector velometer measures a phase difference between $-180°$ and $+180°$, any multiples of $360°$ being ignored. To allow for this, the modulation frequency is varied by a small amount at first, and then by increasingly larger amounts, obtaining at each stage a more accurate figure for the optical length, while ensuring that at no time is the frequency change sufficiently large to "miss" a $360°$ phase shift. Once the operator has aligned the system optically, the measurement sequence is completely automatic. Total measurement time is about two minutes, and at the end of the measurement sequence the controller pronts the optical length, together with the estimate of its standard error calculated from a least squares fit.

To measure the strain i.e. it is not necessary to know the exact refractive index, but merely how it varies with temperature and strain.

It can be shown that:

$$\Delta l = \frac{\Delta L - l \Delta T (\sigma \alpha + \beta)}{\sigma}$$

where $\Delta \rho$=change in physical length, $\Delta L$=change in optical length, L=optical length, $\rho$=datum physical length, T=temperature change, $\alpha$=physical length temperature coefficient, $\beta$=refractive index temperature coefficient, $$\sigma = 1 + \frac{\rho \partial N}{N \partial \rho}$$

The refractive index strain coefficient $\rho/N$. $\partial N/\partial \rho$ can be measured for a particular fibre by measuring fibre extension under load v phase change. This parameter is linear up to at least 2% strain, and has been found in practice to vary very little from fibre to fibre.

If it is required to measure length change while monitoring at a constant frequency as is normally the case during cable installation, the same equipment can be used with different software. In this case the length change $\Delta \rho$ which produces a phase change $\Delta \phi$ at constant frequency is $$\Delta = l \frac{\Delta \phi c}{720 f N \sigma}$$

Thus there has been described a method of continuously measuring the strain in an optical cable during installation by fluid friction into a duct using a computer-controlled frequency-domain optical strain measuring apparatus and coupling via a single-mode rotary optical joint. By monitoring the strain the rate of deployment can be optimised, and the apparatus indicates immediately if the cable or installation system develops a fault. A likely practical situation is for the flow to die or change without warning. This will be detected by the strain equipment and corrective action, e.g. halting installation, can be taken. Without this facility both cable and duct may be damaged.

This equipment can measure lengths up to 30 kilometers of single mode fibre cable.

The connection between the cable 13, the fibres of the cable 1 and the optical rotary joint 6 can be made via elastomeric or fusion splices.

We claim:

1. A method of deploying an optical fibre cable by pulling the cable from a store of the cable comprising monitoring the strain in the cable by monitoring an optical signal in a fibre of the cable and controlling the deployment according to the strain monitored, and wherein the cable is pulled from the store by friction between the cable and the fluid.

2. A method as claimed in claim 1, wherein a pull line is attached to the front of the cable.

3. A method as claimed in claim 1, comprising providing a reflecting end termination at the front end of the cable being deployed, and sending an optical signal along the fibre of the cable via an optical rotary joint coupled to a supply drum from which the cable is being fed during deployment, and monitoring the returned signal.

4. A method as claimed in claim 3 wherein the transmitted and received signals are radio frequency signals modulated on a light carrier, and wherein the phase difference between the transmitted and received signals is used to determine the strain in the cable.

5. A method as claimed in claim 3, wherein the transmitted and received signals are radio frequency signals which are fed into a vector voltmeter to determine the phase difference.

6. A method as claimed in claim 1, comprising measuring the length of cable being deployed by means of a pulse counter to determine the overall strain in the cable.

* * * * *